Patented Aug. 12, 1952

2,606,818

UNITED STATES PATENT OFFICE 2,606,818

RAPID METHOD OF ANALYZING EMULSIONS AND FATTY MINERAL OILS

Samuel Spring and Louise F. Peale,
Philadelphia, Pa.

No Drawing. Continuation of application Serial No. 697,616, September 18, 1946. This application September 28, 1950, Serial No. 187,342

3 Claims. (Cl. 23—230)

(Granted under the act of March 3, 1883, as amended April 30, 1928; 370 O. G. 757)

The present application is a continuation of application Serial No. 697,616 filed on September 18, 1946, in the names of Samuel Spring and Louise F. Peale for "Rapid Method of Analyzing Emulsions and Fatty Mineral Oils," now abandoned.

The invention described herein may be manufactured and used by or for the Government for governmental purposes without the payment of any royalty thereon.

Our invention relates to the chemical analysis of emulsions and fatty-mineral oils and has special reference to methods for quantitative analysis of those materials such as are used in drawing lubricants.

Broadly stated, the object of our invention is to enable the rapid and acceptably accurate analysis of emulsions and fatty-mineral oils by use of simple, inexpensive and readily portable equipment.

Another object is to eliminate the need for analytical balances and other expensive equipment in making the described analyses.

A further object is to enable control analyses to be conveniently and easily made at the place where the lubricant is being used without having to send samples thereof to an elaborately equipped laboratory for analysis.

A still further object is to increase the speed and decrease the labor with which the aforementioned materials may be chemically analyzed.

An additional object is to decrease the skill and effort required to effect these analyses.

In practicing our invention we achieve the foregoing and other objects by taking separate samples of the material to be analyzed, chemically treating same in order to separate out one or more of the various constituents, and then reading off the quantities of the respective ingredients in a conventional graduated Babcock or similar flask. Through the application of certain pertinent formula or simple calculations the just described readings may be utilized to determine the percentage composition of the substances being analyzed. Our novel method of analysis of emulsions and fatty-mineral oils accomplishes the aforementioned objects by the use of volumetric methods which are much more rapid than conventional gravimetric techniques.

*General principles underlying our invention*

The general principles underlying our invention involve a number of analytical procedures some of which are individually well known to the experienced chemist. However, by combining these conventional techniques in a novel manner, and by devising additional unique methods, we have developed a number of new and useful processes which now make possible the comparatively rapid, yet reasonably accurate analysis of drawing and cutting lubricants and other similar materials, in a manner which in certain respects is far superior to any procedure heretofore known.

Some of these general principles and techniques upon which our methods are based include the following:

1. Reduction in errors of weighing original samples. This is done by making up a relatively large volume of "stock solution" of the compound to be analyzed, then using measured volumes of this solution for the individual analyses. (It should be understood that reference to this stock material in this specification will not necessarily indicate the presence of a true chemical solution; in fact, as a general rule, the material will be in the form of a dispersion.)

2. Quantitative measurement of oils by determining their volumes rather than their weights.

3. Determining the amounts of individual constituents of a material by actual measurements of certain components and subtracting their total from the whole in order to ascertain the value of the residual constituent.

4. Determining the quantities of free fatty acid by volumetric titration.

5. Breaking emulsions by "salting-out," followed by solution of the emulsifying agent.

6. Increasing the specific gravity of water-alcohol solutions by addition of glycerine or other polyhydric alcohol so that any oil which may be present will be caused to rise to the surface without the necessity for centrifuging the material.

*Preparation of the "stock solution" in the analysis of emulsions*

The analyst using our method of analysis in determining the percentage composition of emulsions takes a representative sample of the lubricant to be analyzed and weighs out 20 grams (gms.) of the compound which he disperses in 180 milliliters (ml.) of water. An inexpensive scale may be utilized for this purpose, providing it is accurate to within one gram. The amount of a sample which is necessary for the analysis will vary with the accuracy of the scale on which this weight is determined. For example, if the scale is accurate to ½ gm., only 10 gms. of the compound is required and same may be dispersed in 90 ml. of water.

For the purpose of explanation, we shall hereinafter confine the description of our methods to the use of a 20 gm. sample, to which is added 180 ml. of warm water. This water is added in small amounts with thorough mixing after each addition until a smooth paste is formed. After some 40 ml. of the water has thus been added, the remainder of the water may be added quite rapidly. The resulting emulsion should next be passed through a gauze strainer of approximately 100 mesh. Any lumps that may remain may be dispersed by mixing them with a few ml. of liquified emulsion and stirring thoroughly. Once this emulsion (or "stock solution") is prepared, it may be used for all the analyses soon to be described.

If an analysis is to be made of oils containing fatty matter, the preparation of a stock solution as just described is unnecessary. Instead, a 5 ml. sample of the oil is taken directly from the substance to be analyzed.

*Determination of the total fatty matter and mineral oil*

To determine the total fatty matter, soap, and mineral oil in the lubricant sample, 10 ml. of the stock solution are required. This volume of the emulsion is measured as follows. First a 10 ml. graduated cylinder is filled until all the froth is above the uppermost cylinder graduation. Then the froth, plus any accompanying liquid, is carefully removed by means of a medicine dropper so that the liquid actually fills the cylinder to the 10 ml. mark.

The thus measured sample is introduced into a conventional Babcock test milk flask (i. e., the "standard" 8%, 18 gm., 6" Babcock bottle approved by the Association of Official Agricultural Chemists), allowing about 30 seconds for the cylinder to drain. A good technique is to permit the lip of the cylinder to touch the inside of the Babcock flask's neck in order to remove the drop of liquid remaining on the graduated cylinder's lip.

Once the thus measured sample is placed into the Babcock flask, 5 to 10 ml. of concentrated hydrochloric acid or 10 to 20 ml. of hot 50% hydrochloric or sulfuric acid is added, then the flask and its contents are warmed until the oily material in the sample separates as the clear upper layer. The bottom (water) layer should also be clear. It is important that this heating be continued until the water or lower layer attains this clear state with high titer soaps. This may require from one-half to one hour. A sufficient amount of hot water or 50% acid solution is next added in order to cause this oily layer's rise to within the limits of the scale graduations on the neck of the flask. The analyst then reads the volume occupied by this oily material directly from those flask graduations. This volume, for purposes of formula substitution, we may conveniently term "A."

The percentage of all the oily material may then be easily calculated through multiplication of the value for this volume "A" by a factor. The value of this factor is obtained from knowledge of the oil's specific gravity (which can be obtained in any conventional manner) and the volume of one major unit on the scale as read directly from the graduations on the Babcock flask.

The calculation for this determination is as follows:

$$A \times 18 = \text{per cent of total oily material}$$

In determining the volume of oily matter ("A"), the analyst merely reads the divisions of the Babcock flask's scale which parallels the upper layer of oil, and from this reading he subtracts the division of the scale which parallels the oily layer's lower level. Thus, for example, if the upper layer of oil should be adjacent scale division 5.8, and the lower level of the oil layer should be adjacent division 4.2, the value of volume "A" would then be the difference between the two or 1.6.

Occasionally, it may happen that upon addition of the hot water, there will be entrapped in the oil some water bubbles that cannot be readily dislodged. In such a case, it is advisable to repeat the determination. Preferably, too, the reading should be made when the body of the flask is too warm to be comfortably held for more than a few seconds. The approximate temperature for this condition is about 50 degrees C.

In heating the Babcock flask for this and other determinations later to be described, it has been found advantageous to use the following technique: Introduce water in a two liter beaker to a height of 1½ inches. Place the flask in the beaker which is then covered with a watch glass. Then boil the water in the beaker gently, thus developing steam which in turn serves to keep the neck of the flask warm.

*Method for determination of soap*

Following is a preferred method for determining the percentage of soap in a sample of emulsions or oils. A 10 ml. sample of the emulsion stock solution or oil is placed in a standard Babcock test milk flask and 15 ml. of a saturated salt solution is added thereto. The flask is then heated (using the earlier described technique for generating steam heat in a two liter beaker) until a separation into layers of its contents appears, the liquid underneath being fairly clear.

Upon accomplishing the aforementioned layer separation, additions to the flask are made of 15 ml. of hot 50% alcohol followed by sufficient hot 50% alcohol in water to bring the upper oil layer into register with the scale of the Babcock flask. The volume of this oil is read directly from the scale in the manner earlier described, and for convenience of reference is labelled by any character such as "B."

The calculation for this soap determination is then made as follows:

$$(A-B)18 + (A-B)1.8 = \text{per cent soap}$$

wherein:
A = total volume of oily material obtained as earlier described
B = volume of oily material as just outlined above The factor "18" is the product of the number of ml. in each unit of the Babcock flask and the specific gravity of the oil and 100. The expression $1.8(A-B)$ is a 10% correction factor which enables the figure for the free fatty acids from soap to be converted into a figure representing an equivalent amount of soap.

*Determination of mineral oil*

Determination of mineral oil is based on the fact that it is both unsaponifiable and insoluble in alcohol. A 10 ml. sample of the original "stock solution" is placed in a small (125 ml.) Erlenmeyer flask. The flask is heated gently while its contents are swirled, the heating being continued until the original volume of the liquid is reduced by at least one-half (i. e. 5 ml.).

In cases where the percentage of mineral oil is known not to exceed 15%, only 5 ml. of the "stock solution" is required. In such a case the step calling for evaporation of water to one-half the liquid's original volume may be eliminated.

The next steps in this determination include the addition of 25 ml. of alcohol, 10 ml. of a normal alcoholic solution of potassium hydroxide (KOH). (This solution may be prepared by dissolving 6 grams of KOH in 10 ml. of water and adding thereto 90 ml. of 95% alcohol.) The Erlenmeyer flask is then stoppered with a cork through which is fitted a glass tube that extends vertically upwards some two or three feet above the flask. This apparatus makes a simple reflux condenser. The liquid is then refluxed therewith for one hour by boiling gently.

Upon the conclusion of this treatment, the contents are transferred from the Erlenmeyer to a Babcock flask, rinsing any residue from the Erlenmeyer with the aid of about 5 ml. alcohol. The Babcock flask is then heated gently (preferably by employing "steam heat" as earlier described), and warm glycerine is added therein until the uppermost level of the liquid contents registers with the flask's graduated scale. Heating of the flask is then continued until oily globules begin to rise to the top. At this point the flask is permitted to cool and the analyst takes a reading of the volume of the oily material. This reading we shall here identify as the value "C."

The calculation for this determination is then made as follows:

$$C \times 18 = \text{percent of mineral oil}$$

The factor "18" is the product of the volume of one unit of the Babcock flask, the specific gravity of the oil and 100. If a 5 cc. sample was used the calculation is $C \times 2 \times 18 = $ percent mineral oil.

*Determination of free fatty acid*

The percentage of free fatty acid may be determined in a conventional manner such as by titration against sodium or potassium hydroxide using a 10 gm. sample of the stock solution of emulsion or oil.

*Determination of sample's total percentage composition*

As earlier described, by means of well known methods, it is possible to determine the percentages of total oily materials and free fatty acid present in a given sample. By our novel volumetric methods it is possible to determine the percentages of mineral oil and of soap. Having ascertained these values, it is a matter of simple arithmetic to calculate the percentages of fat and water present; the former is determined by subtracting from the percentage of total oily material the sum of the percentages of mineral oil, soap and free fatty acid, while the latter is determined by subtracting from 100% the percentage of total oily material.

*Advantages of our novel analytical methods*

Any skilled chemist, technician or other person who has analyzed emulsions and oils such as are present in drawing and cutting lubricants will be quick to recognize the superior features of our novel analytical methods hereinabove described. To satisfy many practical purposes, there has long been a need for the rapid, simple methods of analysis, such as we here disclose, especially since they can so readily achieve the objects therefor which we have enumerated at the commencement of this specification.

On the basis of very extensive laboratory and shop experimentation, it may safely be said that by our unique analytical procedures, emulsions and fatty-mineral oils may be analyzed with an accuracy of about 5%, which is adequate for most analyses of this type. Furthermore, since our processes require only about three quarters to one and one-half hours as compared to the ten or twelve hours required for the old type methods, it will readily be seen that an inaccuracy such as 5%, from the true value, will be well compensated for by other advantages such as may be found when employing these procedures in controlling the production of lubricants or in field analyses. The aforementioned experimentation likewise disclosed excellent reproducibility of results which tend to establish the fact that our methods are highly reliable despite the comparative speed with which that may be employed.

Examples of our experimental results are given in the charts below:

*Table I—Comparison of accuracy of results obtained by longer, conventional methods and our novel, rapid processes*

COMMERICAL COMPOSITION "AA"

| Constituent | Conventional Method | Our New Method |
| --- | --- | --- |
|  | Percent | Percent |
| Water | 34 | 36 |
| Soap | 28 | 29 |
| Fatty Oil | 30 | 29 |
| Free Fatty Acid | 5 | 5 |
| Mineral Oil | 2 | 0 |

COMMERCIAL COMPOSITION "BB"

| Constituent | Conventional Method | Our New Method |
| --- | --- | --- |
|  | Percent | Percent |
| Water | 37 | 37 |
| Soap | 16 | 16 |
| Fatty Oil | 39 | 40 |
| Free Fatty Oil | 3 | 2 |
| Mineral Oil | 0 | 5 |

COMMERCIAL COMPOSITION "CC"

| Constituent | Conventional Method | Our New Method |
| --- | --- | --- |
|  | Percent | Percent |
| Water | 38 | 41 |
| Soap | 15 | 16 |
| Fatty Oil | 41 | 41 |
| Free Fatty Acid | 4 | 2 |
| Mineral Oil | 0 | 0 |

LABORATORY PREPARED SAMPLE

| Constituent | Conventional Method | Our New Method |
| --- | --- | --- |
|  | Percent | Percent |
| Water | 50 | 48 |
| Soap | 10 | 10 |
| Fatty Oil | 25 | 26 |
| Free Fatty Acid |  |  |
| Mineral Oil | 15 | 15 |

*Table II—Duplicate determinations showing reproducibility of results obtained in making analyses of Table I*

COMMERCIAL COMPOSITION "AA"

|  | Test (a) | Test (b) |
|---|---|---|
| Total Oily Matter | 62.9 | 62.9 |
| Soap | 29.2 | 28.7 |
| Mineral Oil | 0.0 | 0.0 |
| Fat or Fatty Oil | 28.7 | 29.2 |

COMMERCIAL COMPOSITION "BB"

|  | Test (a) | Test (b) |
|---|---|---|
| Total Oily Matter | 62.9 | 62.9 |
| Soap | 14.0 | 14.0 |
| Mineral Oil | 0.0 | 0.0 |
| Fat or Fatty Oil | 42.0 | 42.0 |

COMMERCIAL COMPOSITION "CC"

|  | Test (a) | Test (b) |
|---|---|---|
| Total Oily Matter | 58.6 | 59.5 |
| Soap | 15.8 | 15.3 |
| Mineral Oil | 0.0 | 0.0 |
| Fat or Fatty Oil | 40.8 | 42.2 |

LABORATORY PREPARED SAMPLE

|  | Test (a) | Test (b) |
|---|---|---|
| Total Oily Matter | 51.0 | 52.7 |
| Soap | 10.4 | 10.4 |
| Mineral Oil | 14.4 | 16.2 |
| Fat or Fatty Oil | 26.2 | 26.1 |

Conclusions

From the foregoing, it will be seen that we have developed new and useful methods which enable the rapid and acceptably accurate analysis of emulsions and fatty-mineral oils by use of simple, inexpensive and portable equipment; that we have eliminated the need for analytical balances and other expensive equipment in making the described analyses; that we have enabled the convenient and easy making of analyses at the place where a lubricant is being used without having to send samples thereof to an elaborately equipped laboratory for analysis; that we have increased the speed and decreased the labor with which the aforementioned materials may be chemically analyzed; and that we have decreased the skill and effort required to effect these analyses.

It will be obvious to the experienced chemist that many of the individual methods which we have employed in running a complete analysis of drawing and cutting lubricants are now new. However, as earlier pointed out, some of the methods are new per se; others use old principles in an entirely novel manner to obtain new, useful and hitherto unobvious results. It is these novel methods or unique combinations which we have claimed below as deserving of Letters Patent.

The principal novel step of the present invention is the use of a polyhydric alcohol having a specific gravity greater than 1 to increase the specific gravity of the lower layer of the material being analyzed in order to facilitate and speed up the separation of the oily and unsaponifiable material and the rise of oil droplets without necessitating the use of a centrifuge. Of course, other materials could be used to increase the specific gravity, but they would have disadvantages in reducing the solubility of any soap present (an example of such a material would be salt).

Another main novel feature of the present invention is that of breaking emulsions by the described "salting out" process whereby to make possible the delineation of the oily matter layer upon the subsequent removal of soap by solution in alcohol.

These two novel features form important steps in the general procedure described above for analyzing emulsions and fatty mineral oils. In the claims which follow below, only these novel steps are defined, although it should be understood that those steps can be combined with other conventional laboratory techniques and mathematical calculations to make certain analytical determinations.

We claim:

1. The steps in the process of determining the amount of unsaponifiable substances in the total oily matter which may be present in oily emulsions and oils, said steps consisting of adding to the oily matter an alkali to react with the saponifiable material therein, and then adding a sufficient quantity of a high specific gravity polyhydric alcohol to keep the saponified matter in solution and to increase the specific gravity of that solution so that the unsaponifiable oily matter separates from the saponified matter, whereby the separated oily matter layer is rapidly and sharply defined for subsequent measurement.

2. The steps in the process of determining the amount of unsaponifiable substances in the total oily matter which may be present in oily emulsions and oils, said steps consisting of adding to the oily matter an alkali to react with the saponifiable material therein, and then adding a sufficient quantity of glycerine to keep the saponified matter in solution and to increase the specific gravity of that solution so that the unsaponifiable oily matter separates from the saponified matter, whereby the separated oily matter layer is rapidly and sharply defined for subsequent measurement.

3. The steps in the process of determining the amount of unsaponifiable substances in the total oily matter which may be present in oily emulsions and oils, said steps consisting of adding to the oily matter an alkali to react with the saponifiable material therein, and then adding a sufficient quantity of ethylene glycol to keep the saponified matter in solution and to increase the specific gravity of that solution so that the unsaponifiable oily matter separates from the saponified matter, whereby the separated oily matter layer is rapidly and sharply defined for subsequent measurement.

SAMUEL SPRING.
LOUISE F. PEALE.

REFERENCES CITED

The following references are of record in the file of this patent:

UNITED STATES PATENTS

| Number | Name | Date |
|---|---|---|
| 1,860,248 | Hyman | May 24, 1932 |
| 2,089,017 | Burk | Aug. 3, 1937 |
| 2,162,281 | Ledbetter | June 13, 1939 |
| 2,318,714 | Robertson | May 11, 1943 |
| 2,418,814 | Ayers | Apr. 15, 1947 |

OTHER REFERENCES

Methods of Analysis, AOAC 6th Ed. AOAC, Washington, D. C., 1945, page 73, #6.105.